United States Patent [19]

Restelli

[11] Patent Number: 4,879,977
[45] Date of Patent: Nov. 14, 1989

[54] PRE-TIMED DISTRIBUTION UNIT, IN PARTICULAR FOR INTERNAL COMBUSTION ENGINES

[75] Inventor: Amedeo A. Restelli, Cernusco Lombardone, Italy

[73] Assignee: Societa Italiana Catene Calibrate Regina S.p.A., Milan, Italy

[21] Appl. No.: 186,241

[22] Filed: Apr. 26, 1988

[30] Foreign Application Priority Data

May 6, 1987 [IT] Italy .................................. 20412 A/87

[51] Int. Cl.⁴ .......................... F01L 1/02; F16H 7/06
[52] U.S. Cl. .................................. 123/90.31; 474/140
[58] Field of Search ............... 123/90.15, 90.17, 90.31; 474/140, 144, 146, 147

[56] References Cited

U.S. PATENT DOCUMENTS

| | | | |
|---|---|---|---|
| 2,489,772 | 11/1949 | Hall | 474/140 |
| 2,526,173 | 10/1950 | Thomassin | 474/140 |
| 4,193,314 | 3/1980 | Horner et al. | 474/140 |
| 4,607,601 | 8/1986 | Kohler | 123/90.31 |
| 4,642,073 | 2/1987 | Restelli | 474/140 |
| 4,723,517 | 2/1988 | Frost | 123/90.31 |
| 4,729,348 | 3/1988 | Okada et al. | 123/90.31 |

FOREIGN PATENT DOCUMENTS

| | | |
|---|---|---|
| 635659 | 11/1963 | Belgium . |
| 2414747 | 8/1979 | France . |
| 2594514 | 10/1987 | France . |
| 2092705 | 8/1982 | United Kingdom . |

Primary Examiner—Willis R. Wolfe
Attorney, Agent, or Firm—Foley & Lardner, Schwartz, Jeffery, Schwaab, Mack, Blumenthal & Evans

[57] ABSTRACT

The pre-timed distribution unit, in particular for internal combustion engines, is constituted by a first sprocket wheel, and a second sprocket wheel with a plurality of sprocket sets, a multiple-link chain taut between said sprocket wheels and defining a space inside which a guide shoe is housed, which is constituted by at least a plate-shaped structure provided with guides radiused by a first and a second mating, trueing circumferential edges. In an alternative form of practical embodiment, the unit comprises a guide shoe whose guides are associated with enlarged, laterally protruding portions.

10 Claims, 2 Drawing Sheets

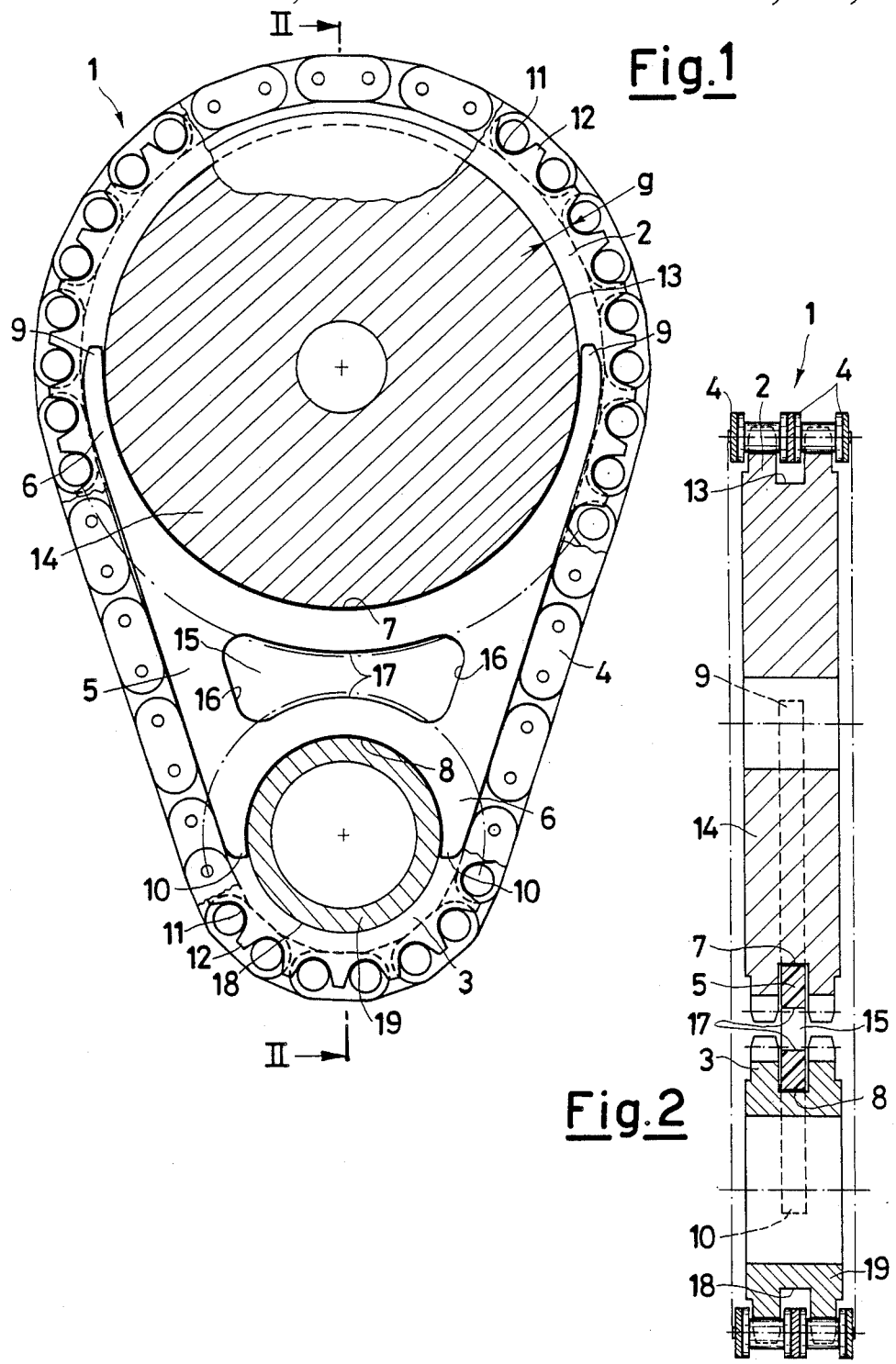

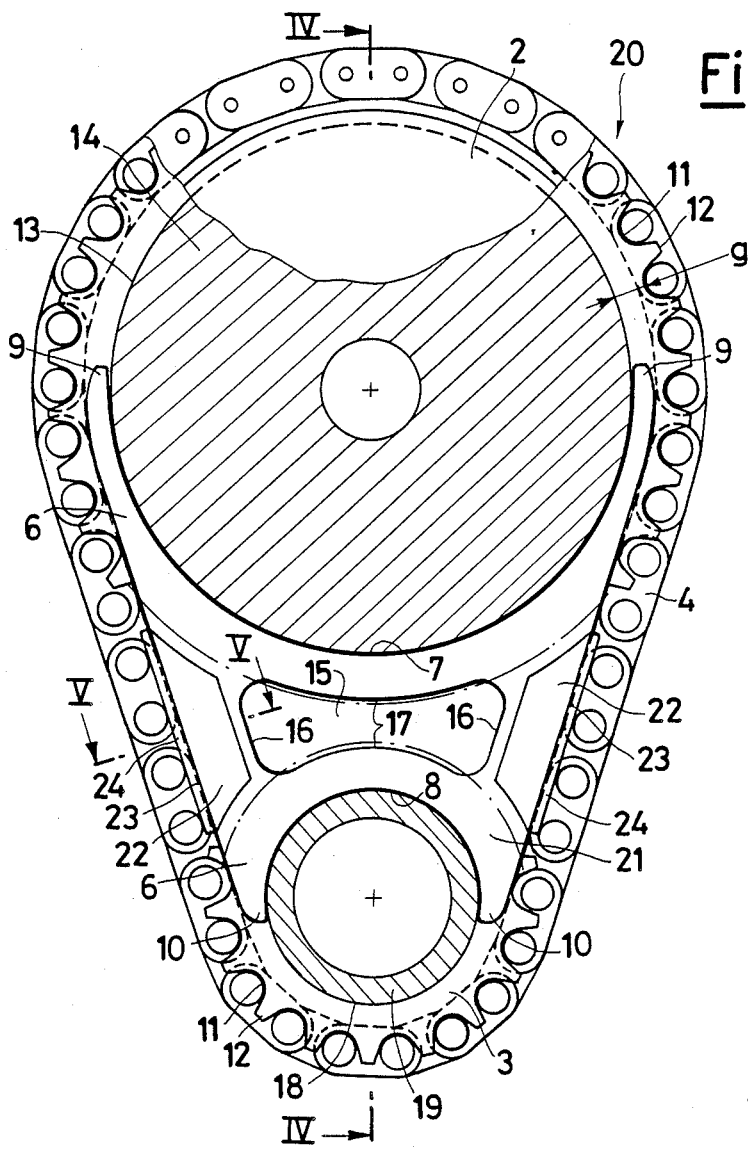
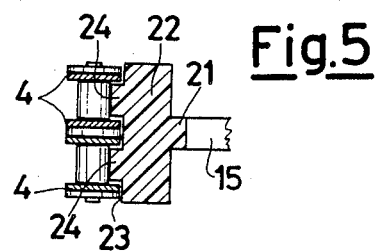
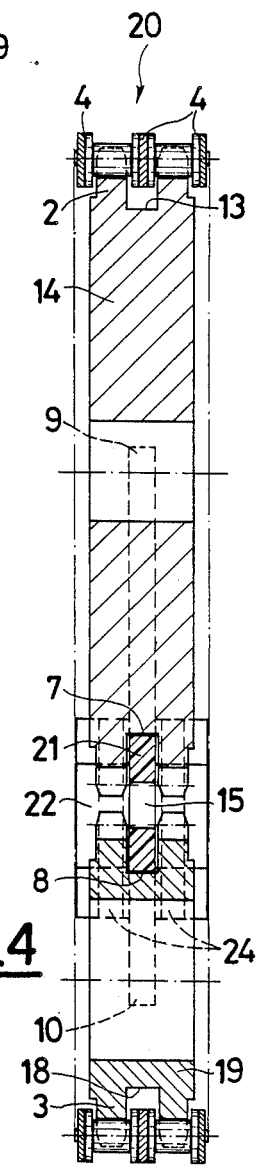
Fig.3
Fig.5
Fig.4

PRE-TIMED DISTRIBUTION UNIT, IN PARTICULAR FOR INTERNAL COMBUSTION ENGINES

The present invention relates to a pre-timed distribution unit, in particular for internal combustion engines.

The distribution units for internal combustion engines known from the previous art are constituted by a couple of sprocket wheels connected in phase by a transmission chain, usually associated with chain tightener and/or flapping-preventing means, which are generally of guide shoe type.

Distribution units of pre-timed type are already known from the prior art, which achieve their purposes thanks to guide shoes constituted by two half-guide shoes, which join each other in correspondence of the space existing between the sprocket wheels and the branches of the chain which links them.

The overall dimensions of said units, although small, are not yet small enough in order to make it possible said units to be generally applied to all engine types. The above drawback penalizes in particular the distributions of engines equipped with a multiple-link chain, wherein the problem of the overall dimensions is already particularly felt.

One of the purposes of the present invention is to overcome the above-said drawbacks.

Other purposes are the improvement of the functionality, together with the simultaneous reduction of the costs of transmission unit manufacturing and assemblage.

Such purposes are achieved by means of a pre-timed distribution unit, in particular for internal combustion engines, which is constituted by a first sprocket wheel, and a second sprocket wheel both with a plurality of sprocket sets, which are respectively a driven and a driving sprocket wheel, a relevant multiple-link chain taut between said two sprocket wheels, defining a space which can be associated with guide shoe means, characterized in that said guide shoe means are constituted by at least a contoured plate-shaped structure, totally contained inside said space.

The invention is disclosed in the following in greater detail, with the aid of the drawings, which depict an exemplifying form of practical embodiment thereof.

FIG. 1 shows a partially sectional front view of a distribution unit realized in conformity with the present invention, wherein the front set of sprockets is only partially shown.

FIG. 2 shows a sectional view according to path II—II of the unit of FIG. 1.

FIG. 3 shows a front view of an alternative form of practical embodiment of the distribution device of present the invention, depicted according to the same modalities as of FIG. 1.

FIG. 4 shows a sectional view according to path IV—IV of the unit of FIG. 3.

FIG. 5 shows a partial sectional view according to path V—V of FIG. 3.

Referring to the above mentioned Figures, the pre-timed distribution unit, generally indicated by the reference numeral 1—and simply referred to, in the following, as the "unit"—comprises a first sprocket wheel 2 and a second sprocket wheel 3, with two sets of sprockets, which are, respectively, a driving wheel and driven wheel, as well as a multiple, double-link-row chain 4, and a guide shoe 5.

The guide shoe 5 has a contoured, plate-shaped structure, and comprises a couple of guides 6, which support and guide the chain 4, radiused by a first circle-arc edge 7 and a second circle-arc edge 8 respectively mating with the first sprocket wheel 2 and the second sprocket wheel 3.

Both said guides 6 end with ends respectively indicated by the reference numerals 9 and 10.

The ends 9 are extended in such a way that the first circumferential edge 7 has a total length longer than that of a half-circle. Such an extension is allowed by the fact that the distance, indicated by the letter "g" in the Figures, existing between the bottom 11 of each sprocket 12, and the outermost cylindrical surfaces 13–18 of the hubs 14–19 is equal to the thickness of the ends 9 and 10 of the guides 6.

In order to make it easier to assemble the guide shoe 5, the ends 9 and 10 can be made in such a way that they tangentially mate with the outermost surfaces 13 and 18 of the hubs 14 and 19.

The guide shoe 5 is furthermore provided with a weight-reducing opening 15, having edges 16 and 17 respectively radiused with, and parallel to, the opposite and divergent guides 6, and the circumferential edges 7 and 8.

In order to assemble the unit 1, it is enough to position the first sprocket wheel 2 in phase with the second sprocket wheel 3, and spaced apart from this latter by the guide shoe 5.

The edges 7 and 8 of the guide shoe 5 enter between the space existing between two adjacent sprocket sets, mating with the outermost surfaces 13 and 18 of the hubs 14 and 19 of the sprocket wheels 2 and 3.

The chain 4 is closed around the elements 2, 3, 5, determining the stable, ultimate and pre-timed configuration of the unit, ready to be assembled on the relevant engine. The guide shoe 5 is totally contained inside the space bounded by the sprocket wheels 2, 3 and by the branches of the chain 4, which said guide shoe mates with, through the couple of guides 6, performing an action of support, guide, and flapping-prevention.

The action of the guides 6 is particularly efficacious thanks to their structure, which makes it possible the ends 9 and/or 10 to continue to mate with the chain until this latter has already started to inmesh, at one side, and to leave, at the other side, the sprockets of the sprocket wheels 2 and 3.

In case the transmission unit 1 comprises sprocket wheels 2 and 3 with a plurality of sets of sprockets, and a corresponding multiple chain 4, a plurality of overlapping guide shoes 5, all identical to one another, can be used.

Their number shall be equal to the number of sprocket sets, decreased by one. The guide shoes 5 can be mutually constrained, or not, in such a way as to constitute a multiple guide shoe, not shown in the figures, for the sake of simplicity.

In an alternative form of practical embodiment depicted in FIGS. 3, 4 and 5, and wherein the indentical elements have been indicated by the same reference numerals as of FIGS. 1 and 2, the distribution unit of the invention, now generally indicated by the reference numeral 20, is still constituted by a first sprocket wheel 2 and a second sprocket wheel 3 linked by a multiple chain 4 and a guide shoe 21.

The guide shoe 21, differently from the guide shoe indicated by the reference numeral 5, has a couple of enlarged portions 22 positioned along the sides of each guide 6. Each enlarged portion 22 defines, with the same guides 6, a plane 23 mating with the two branches of the chain 4, but not laterally protruding beyond the outer contour thereof.

Each plane 23 can be provided with protrusions 24 mating with the rollers of the chain 4.

In case of distribution units similar to that as indicated by the reference numeral 20, but with sprocket wheels with more than two sets of sprockets (not shown in the Figures), what already said for unit 1 holds true. In particular, the enlarged portions 22 can be advantageously used in order to also constitute a constraint element between the various guide shoes 20, it being understood that the outermost enlarged portions may constitute a simple support element for the chain 4.

The advantages offered by such a unit can be summarized as follows:

Low cost of realization, thanks to the simple structure, easily reproducible and associatable to other identical structures in case the unit has sprocket wheels with more than two sprocket sets;

Low assemblage cost, because the unit can be composed and obtained in a pre-timed, stable and ultimate with no need of using further mechanical elements different from the sprocket wheels, the guide shoes, and the chain;

Operation fluidity, with the total absence of flapping due, in particular, to the shape of the ends of the guides 6, which can be so extended, as to mate with the chain 4 up to the points wherein this latter has already started to inmesh with, at one side, and to leave, at the other side, the sprockets of the sprocket wheels 2 and 3;

True possibility of using the unit in a whatever engine, because the relevant guide-shoe means are totally contained inside the space bounded by the sprocket wheels 2 and 3, and by the chain 4.

I claim:

1. A pre-timed distribution unit for internal combustion engines, comprising:
    a first driven sprocket wheel and a second driving sprocket wheel each having a plurality of sprocket sets;
    a multiple-link chain means disposed about said two sprocket wheels;
    at least one pair of adjacent sprocket sets on each sprocket wheel defining an annular space therebetween for receiving a contoured plate-shaped shoe means;
    said guide shoe means extending in an inner space between said sprocket wheels;
    said guide shoe means being totally contained inside said inner space.

2. A pre-timed distribution unit for internal combustion engines, comprising:
    a first driven sprocket wheel and a second driving sprocket wheel, each having a plurality of sprocket sets;
    a multiple link chain means disposed about said sprocket wheels;
    at least one pair of adjacent sprocket sets on each sprocket wheel defining an annular recess therebetween for receiving a contoured, plate-shaped guide shoe means, said annular recesses having a depth;
    said guide shoe means extending in an inner space between said sprocket wheels;
    said guide shoe means being totally contained inside said inner space;
    said guide shoe means each having a pair of support guide portions engaging said annular recesses and concentric therewith;
    said support guide portions having end portions with thickness equal to the depth of said annular recess.

3. A pre-timed distribution unit for internal combustion engines, comprising:
    a first driven sprocket wheel and a second driving sprocket wheel, each having a plurality of sprocket sets;
    a multiple link chain means disposed about said sprocket wheels;
    at least one pair of adjacent sprocket sets on each sprocket wheel defining an annular space therebetween for receiving a contoured, plate-shaped guide shoe means;
    said guide shoe means extending in an inner space between said sprocket wheels;
    said guide shoe means being totally contained inside said inner space;
    said guide shoe means each having a pair of support guide portions engaging said annular spaces and concentric therewith, thereby defining first and second circumferential edges between said first and second sprocket wheels and said pair of support guide portions;
    at least one of said circumferential edges having a length greater than half the circumference of the associated sprocket wheel.

4. Unit according to claim 3, wherein end portions of the support guide portions of the guide shoe means tangentially mate with the respective circumferential edges.

5. A pre-timed distribution unit for internal combustion engines, comprising;
    a first driven sprocket wheel and a second driving sprocket wheel, each having a plurality of sprocket sets;
    a multiple link chain means disposed about said sprocket wheels;
    a contoured, plate-shaped guide shoe means extending in an inner space between said sprocket wheels;
    said guide shoe means being totally contained inside said inner space;
    said guide shoe means defining a weight-reducing opening therein.

6. The pre-timed distribution unit according to claim 5, wherein said weight-reducing opening has a pair of edges concentric with the circumference of said sprocket wheels.

7. A pre-timed distribution unit for internal combustion engines, comprising;
    a first driven sprocket wheel and a second driving sprocket wheel, each having a plurality of sprocket sets;
    a multi-branch, multiple link chain means disposed about said sprocket wheels to engage said plurality of sprocket sets;
    each pair of adjacent sprocket sets on each sprocket wheel defining an annular space therebetween for receiving a contoured, plate-shaped guide shoe means so that the number of guide shoes is one fewer than the number of sprocket sets on each wheel;
    said guide shoe means extending in an inner space between said sprocket wheels;
    said guide shoe means being totally contained inside said inner space;

each said guide shoe having a constraint means formed from a pair enlarged portions;

said enlarged portions being positioned to define a plane mating with said multibranch chain means and to provide support therefor.

8. The pre-timed distribution unit according to claim 7, wherein said guide shoe means form a guide shoe pack and said plane extends laterally to support the claim means beyond the support guide portions of the guide shoe means.

9. The pre-timed distribution unit according to claim 8, wherein said enlarged portion has a plurality of protrusions extending laterally therefrom to engage said multi-link chain means.

10. The pre-timed distribution unit according to claim 8, wherein said guide shoe pack is an integral structure.

* * * * *